United States Patent
Wong et al.

[11] Patent Number: 5,873,920
[45] Date of Patent: Feb. 23, 1999

[54] LOW RESTRICTION, HIGH PERFORMANCE AIR FILTER

[75] Inventors: Johnny H. Wong, Gastonia; Louis Michael Dubowicz, Charlotte, both of N.C.

[73] Assignee: Dana Corporation, Toledo, Ohio

[21] Appl. No.: 721,454

[22] Filed: Sep. 27, 1996

[51] Int. Cl.$^6$ ............................................. B01D 47/00
[52] U.S. Cl. ............................ 55/498; 55/385.3; 55/502; 55/528; 55/DIG. 28
[58] Field of Search ............................... 55/491, 497, 498, 55/501, 502, 495, DIG. 35, DIG. 28, DIG. 31, 385.3, 492, 510, 521, 528

[56] References Cited

U.S. PATENT DOCUMENTS

| | | | |
|---|---|---|---|
| 2,134,601 | 10/1938 | Campbell | 55/492 |
| 2,943,699 | 7/1960 | Thornburgh | 55/498 |
| 3,095,290 | 6/1963 | Hockett . | |
| 3,326,382 | 6/1967 | Bozek et al. . | |
| 3,348,695 | 10/1967 | Rosaen | 55/528 |
| 3,352,294 | 11/1967 | Biller et al. | 55/DIG. 28 |
| 3,385,038 | 5/1968 | Davis | 55/492 |
| 3,413,782 | 12/1968 | Bartlett | 55/510 |
| 3,417,551 | 12/1968 | Bonell | 55/498 |
| 3,448,862 | 6/1969 | Kudlaty . | |
| 3,606,739 | 9/1971 | Peterson | 55/491 |
| 3,949,130 | 4/1976 | Sabee et al. | 55/528 |
| 4,074,985 | 2/1978 | Willas | 55/498 |
| 4,128,408 | 12/1978 | Poole | 55/498 |
| 4,184,966 | 1/1980 | Pall | 55/497 |
| 4,233,043 | 11/1980 | Catterson . | |
| 4,259,096 | 3/1981 | Nakamura et al. | 55/510 |
| 4,268,289 | 5/1981 | Polaner | 55/498 |
| 4,303,426 | 12/1981 | Battis | 55/498 |
| 4,375,798 | 3/1983 | Garretson | 55/DIG. 28 |
| 4,419,241 | 12/1983 | Hoffmann | 55/497 |
| 4,522,876 | 6/1985 | Hiers | 55/DIG. 35 |
| 4,759,782 | 7/1988 | Miller et al. | 55/528 |
| 4,878,930 | 11/1989 | Manniso et al. . | |
| 5,006,235 | 4/1991 | Cooper | 55/502 |
| 5,030,263 | 7/1991 | Kemp | 55/498 |
| 5,064,089 | 11/1991 | Schultz | 55/495 |
| 5,102,436 | 4/1992 | Grabowski | 55/498 |
| 5,160,519 | 11/1992 | Svensson et al. | 55/498 |
| 5,275,636 | 1/1994 | Dudley et al. | 55/502 |
| 5,350,515 | 9/1994 | Stark et al. . | |
| 5,368,621 | 11/1994 | Pool | 55/498 |
| 5,427,597 | 6/1995 | Osendorf | 55/528 |
| 5,549,085 | 8/1996 | Endrigo | 55/DIG. 28 |
| 5,591,338 | 1/1997 | Pruette et al. | 55/492 |

*Primary Examiner*—C. Scott Bushey
*Attorney, Agent, or Firm*—Millen, White, Zelano, & Branigan, P.C.

[57] ABSTRACT

A low restriction air filter is especially useful for racing engines and includes a filter media of spun-bonded synthetic material, such as polyester co-pleated with a metal screen on the dirty side of the filter. An expanded metal aluminum screen surrounds the clean side of the filter media and annular end seals made of plastisol seal the axial ends of the filter media. The filter element has an inside diameter of about 14 inches, a height of about 4 inches and a filter media thickness in the radial direction of about 1 inch.

5 Claims, 1 Drawing Sheet

LOW RESTRICTION, HIGH PERFORMANCE AIR FILTER

FIELD OF THE INVENTION

The present invention relates to low restriction, high performance air filters, more particularly, the present invention relates to low restriction, high performance air filters for use with in internal combustion engines used in racing cars.

BACKGROUND OF THE INVENTION

Air filters used with internal combustion engines desirably remove particles from intake air desirably with minimal reduction in air flow and minimal increase in restriction in order to result in increased horse power, torque, and engine efficiency. Engines used in automobile racing have somewhat unique requirements because the engines run at very high rpms for relatively short periods of time under somewhat unique environmental conditions. Since the engines consume relatively large amounts of intake air, it is still necessary to filter the air to maintain engine performance over the course of a race. Among the concerns of racing teams are high restriction caused by intake air filters; heat which may adversely effect the performance and efficiency of air filters, and weight because, in racing automobiles, controlling weight is an important consideration. While the weight of an air filter might appear to be a relatively insignificant concern, reduction in the weight of an air filter combined with reductions in weight of other engine and chassis components result in composite weight reduction which can be of considerable significance in configuring racing cars.

Current filters used in racing car engines are made mostly with natural cellulose fibers that are pleated either with or without wire screen support. The materials comprising these filters create higher restriction when combined together which decreases engine performance both initially and over the course of a race. Moreover, the current filters are relatively heavy, no attention having been paid to the desirability of decreasing the weight of any component wherever possible.

SUMMARY OF THE INVENTION

It is a feature of the present invention to provide a new and improved air filter for use with internal combustion engines and especially useful with internal combustion engines used for racing.

The present invention is directed to an annular air filter element for use with internal combustion engines and include a pleated filter media material configured as an annulus defining a hollow core, the annulus having an outer periphery, an inner periphery and axial ends. The filter material is co-pleated with wire mesh at the inner periphery; and a cylindrical metal screen surrounds the outer periphery. Annular seals close the axial ends.

In a more specific aspect of the invention, the filter media material is a spun-bonded synthetic material and in a still more specific aspect of the invention, the spun-bonded synthetic material is spun-bonded polyester.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
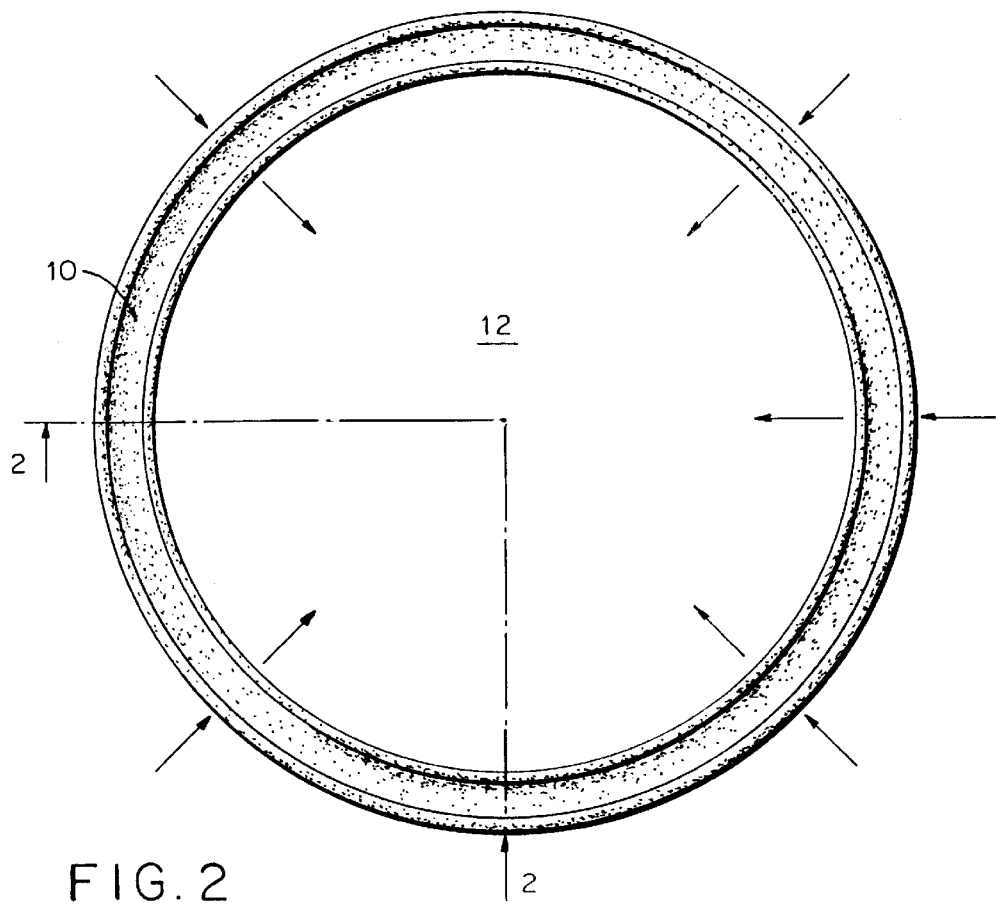
FIG. 1 is a top view of an air filter configured in accordance with the principles of the present invention.

Referring now to FIG. 1, there is shown an air filter 10 configured in accordance with the principles of the present invention and especially useful for filtering intake air for racing car engines. The air filter 10 is annular in configuration with a hollow core 12 which has an internal diameter of about, for example, 13.85 inches. The thickness of the filter media 14 is, for example, about 1.00 inch and its axial height is about 4 inches, thereby providing a filter having an axial height substantially smaller than its selected diameter. The hollow core 12 of the filter element 10 is therefore relatively large with respect to the mass of the filter media 14 as compared to filter elements used with regular automobile engines. This results in lower restriction and greater air flow as well as air flow which tends to be more laminar. As is seen in FIG. 1, air flows from outside of the filter into the hollow core 12 before flowing to the engine.

Figure 2:
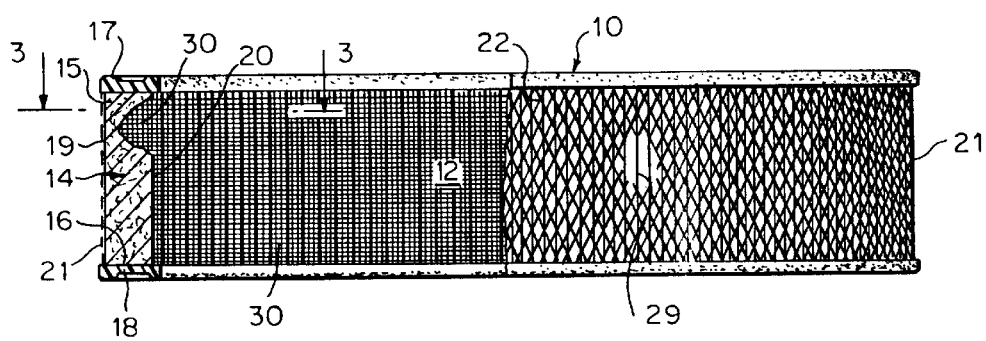
FIG. 2 is a side view, partially in elevation, of the air filter of FIG. 1.
Figure 3:
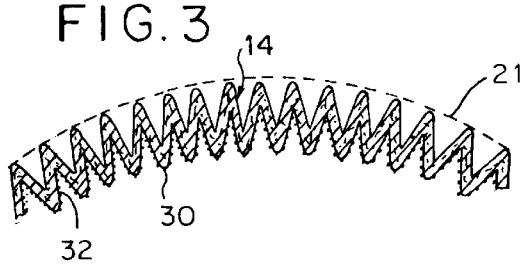
FIG. 3 is a top view of a portion of a filter media used with the air filters of FIGS. 1 and 2.
Figure 4:
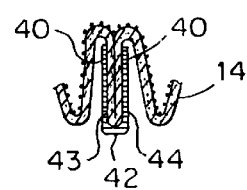
FIG. 4 is a portion of the filter media showing ends thereof joined by a clip.

Referring now to FIGS. 2–4 in combination with FIG. 1, it is seen that the filter media 14 is pleated and arranged in the form of an annulus that surrounds the hollow core 12. The pleated filter media 14 has upper and lower axial ends 15 and 16, respectively, embedded in an upper seal 17 of rigid plastisol and a lower seal 18 of rigid plastisol, respectively. The seals 17 and 18 extend radially slightly past the outer and inner peripheries 19 and 20 of the annulus formed by the pleated filter media 14.

Disposed around the outer periphery 19 or "dirty" side of the pleated filter media 14 is an expanded metal screen 21 of light weight metal such as expanded aluminum. The expanded metal screen 21 has a seam 22 which is aligned with a pleat clip 24 which holds the ends of the pleated filter media together. By aligning both the seam 22 and the pleat clip 24, reduction in restriction occurs through the filter media 14.

As is seen in FIGS. 2 and 3, the filter media 14 is co-pleated with a wire mesh 30 which extends over the inner surface 32 or clean side of the filter media. Consequently, the filter media is supported by both the outer expanded metal screen 21 around its outer periphery 19 and by the wire mesh 30 over its inner surface 32. In a preferred embodiment, the wire screen support is epoxy coated steel and is secured to the inner surface 32 of the media 14 with a silicon adhesive, which adhesive is also applied to the clip 24 and the seam joining the ends of the media 14.

As is seen in FIG. 4, the clip 24 connecting the free ends of the filter media 14 has a pair of side panels 40 joined by a bight 42 which holds the end pleats 43 and 44 of the filter media 14 together.

Preferably, the filter media is a 100% spun-bonded, synthetic media which is light in weight and is hydrophobic so as to not absorb liquid, which liquid might increase restriction and lower the efficiency of the filter. An example of a preferable filter media material is spun-bonded polyester. The resulting filter media is washable and reusable and is especially suitable for trapping the more common particles occurring on NASCAR tracks.

The aforedescribed air filter does not degrade due to high under hood temperatures occurring in race cars and maintains its efficiency over the duration of a race while providing relatively even air flow of outside air to the engine which results in more uniform usage of intake air.

What is claimed is:

1. An annular air filter element specifically for filtering intake air for internal combustion engines used in race cars, the filter element comprising:

a filter media of spun bonded synthetic material arranged as an annulus and having an external dirty side and an internal clean side, the annulus comprising the media having a diameter which is at least a multiple greater than its height and a thickness which is an order of magnitude less than its diameter;

a wire mesh screen disposed on the clean side of the filter media, the wire mesh screen being co-pleated in the annulus with the filter media and defining therewith a hollow central core for receiving filtered air;

the annulus formed by the filter media and wire mesh screen being relatively light in weight, low in restriction and heat resistant;

a cylindrical metal support with openings therethrough for the passage of air surrounding the dirty side of the filter media; and upper and lower annular seals of a resin material positioned at the axial ends of the filter media.

2. The filter element of claim 1, wherein the spun-bonded material is polyester.

3. The filter element of claim 2, wherein the hollow core is about 14 inches in diameter, the filter media has a radial thickness of about 1 inch and the filter element has a height of about 4 inches.

4. The filter element of claim 3, wherein the expanded metal screen is aluminum with free ends joined at a seam and wherein the co-pleated filter media has free ends joined by a clip wherein the clip and seam are radially aligned so as to minimize air flow restriction.

5. The annular filter element of claim 1, wherein the metal support is an expanded metal support.

* * * * *